US010435152B1

(12) United States Patent
Cook et al.

(10) Patent No.: US 10,435,152 B1
(45) Date of Patent: Oct. 8, 2019

(54) AIRFOIL CABLES FOR USE WITH DRONES

(71) Applicant: Superior Essex International LP, Atlanta, GA (US)

(72) Inventors: Thomas Christopher Cook, Woodstock, GA (US); Robin D. Gainsford, Marietta, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 15/984,890

(22) Filed: May 21, 2018

(51) Int. Cl.
| H01B 7/00 | (2006.01) |
| B64C 39/02 | (2006.01) |
| G02B 6/04 | (2006.01) |
| H01B 7/04 | (2006.01) |
| H01B 11/22 | (2006.01) |
| H01B 9/00 | (2006.01) |

(52) U.S. Cl.
CPC .......... *B64C 39/022* (2013.01); *B64C 39/024* (2013.01); *G02B 6/04* (2013.01); *H01B 7/043* (2013.01); *H01B 9/005* (2013.01); *H01B 11/22* (2013.01); *B64C 2201/06* (2013.01); *B64C 2201/122* (2013.01); *B64C 2201/148* (2013.01)

(58) Field of Classification Search
CPC ........ H01B 7/043; H01B 9/005; H01B 11/22; H01B 7/04; H01B 7/00; H01B 7/0009; H01B 7/0045; B64C 39/022; B64C 39/024; B64C 2201/06; B64C 2201/122; B64C 2201/148; G02B 6/04; H02G 15/00; H02G 15/007; H02G 15/013; H02G 15/04; H02G 15/18

USPC ....... 174/70 R, 68.1, 68.3, 72 R, 72 A, 72 C, 174/74 R, 77 R, 79, 88 R, 70 C, 70 A, 95, 174/100, 110 R, 101.5, 113 R
See application file for complete search history.

(56) References Cited

U.S. PATENT DOCUMENTS

| 3,286,020 A * | 11/1966 | McLoughlin | .......... H01B 5/002 174/127 |
| 3,443,020 A * | 5/1969 | Loshigian | .............. H02G 15/14 114/243 |
| 3,613,627 A * | 10/1971 | Kennedy | ............... B63B 21/663 114/243 |
| 4,160,872 A * | 7/1979 | Lundberg | ................. H01B 7/12 174/101.5 |
| 4,350,110 A * | 9/1982 | Knutson | .................. H02G 1/10 114/243 |
| 4,655,155 A * | 4/1987 | Folb | ..................... B63B 21/663 114/243 |

(Continued)

FOREIGN PATENT DOCUMENTS

| FR | 3033256 | 9/2016 |
| WO | WO2016203359 | 12/2016 |

*Primary Examiner* — Angel R Estrada

(57) ABSTRACT

A hybrid cable configured to tether a drone or other aerial device to a base station may include at least one conductor configured to carry a power signal and at least one optical fiber component. A jacket may be formed around the at least one conductor and the at least one optical fiber component. The jacket may have an airfoil cross-sectional shape that is symmetrical about a center line extending from a first rounded edge to a second trailing edge. As a result, the cable may orient itself towards the wind and a lift force exerted on the cable may be approximately equal along opposite lateral sides of the cable.

20 Claims, 3 Drawing Sheets

(56) References Cited

U.S. PATENT DOCUMENTS

| | | | | |
|---|---|---|---|---|
| 5,171,942 A * | 12/1992 | Powers | ................... | H01B 5/08 |
| | | | | 174/129 R |
| 7,631,834 B1 | 12/2009 | Johnson et al. | | |
| 7,872,199 B2 * | 1/2011 | Karlsen | ................... | H01B 7/14 |
| | | | | 174/120 R |
| 9,006,574 B2 * | 4/2015 | Kagoura | ............... | H01B 7/045 |
| | | | | 174/107 |
| 9,029,704 B2 * | 5/2015 | Jeroense | ............... | H01B 7/045 |
| | | | | 174/103 |
| 9,290,269 B2 | 3/2016 | Walker et al. | | |
| 9,581,778 B2 | 2/2017 | O'Day et al. | | |
| 10,046,833 B2 * | 8/2018 | Quappen | ............... | F03B 17/06 |
| 2007/0200027 A1 | 8/2007 | Johnson | | |
| 2016/0144958 A1 | 5/2016 | Woodworth et al. | | |
| 2016/0185456 A1 | 6/2016 | Ducharme et al. | | |
| 2016/0309341 A1 | 10/2016 | Priest et al. | | |
| 2016/0309346 A1 | 10/2016 | Priest | | |

\* cited by examiner

AIRFOIL CABLES FOR USE WITH DRONES

TECHNICAL FIELD

Embodiments of the disclosure relate generally to cables intended for use with drones and, more particularly, to hybrid cables having an airfoil cross-sectional shape that are intended for use with tethered drones.

BACKGROUND

Drones are increasingly utilized for a wide variety of different purposes and applications. In certain applications, such as construction site verification and/or aerial surveillance utilized by journalists and the police, drones are tethered to a base situated on the ground. Tethered drones and balloons may also be equipped with antennas and other equipment that permit the drones to transmit telecommunications signals, for example, for cellular or public safety purposes. For example, tethered drones can be used as a rapidly deployable telecommunications signal in lieu of or in addition to conventional telecommunications towers and other systems.

One advantage of a tethered drone (or other tethered device) is that the tether can be used to transmit power to the drone, thereby allowing the drone to remain airborne for extended period of time. However, conventional tethers are often subject to wind and/or other weather conditions which may adversely affect the tethers. For example, wind may lead to unwanted movement of the drone and/or unwanted vibrations that negatively impact the drone. Accordingly, there is an opportunity for improved cables for use with drones, balloons, and other tethered devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to hybrid cables that may be utilized in conjunction with tethered drones, balloons, and/or other aerial devices. In certain embodiments, a hybrid cable may extend between a tethered aerial device and a base station, such as a ground-based vehicle or other suitable base station. Additionally, the hybrid cable may include a wide variety of suitable transmission media capable of providing signals to the tethered aerial device. For example, the hybrid cable may include one or more conductors that are configured to transmit power and/or other suitable signals to the aerial device. The hybrid cable may also include one or more optical fiber components, such as an optical fiber component containing one or more optical fibers and/or optical fiber ribbons, configured to transmit communications signals to the aerial device.

According to an aspect of the disclosure, the cable may include an outer jacket having a cross-sectional shape that permits the cable to orient itself towards the wind when it is used in conjunction with an aerial device. For example, the outer jacket may have a symmetrical cross-sectional shape extending from a first edge that is rounded and that further tapers from the first edge to a tailing second edge. In certain embodiments, the cross-sectional shape may be characterized as an airfoil shape that is symmetrical on apposite sides of a cross-sectional line that extends through the first and second edges. When the cable is utilized as a tether for an aerial device (e.g., a drone), the cable may be swivel or gimbal connected to the aerial device and/or the base, thereby allowing the cable to pivot or rotate. Further, when wind or another force is exerted onto the cable, the resulting lift may cause the cable to orient itself with the first edge (i.e., the rounded edge) facing the wind. The symmetrical cross-sectional shape may also result in equal lift forces along opposite lateral directions or sides of the cable when the first edge faces the wind. As a result, the cable may align in a wind-resistant configuration, thereby reducing the effects of wind forces and/or Aeolian vibration.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
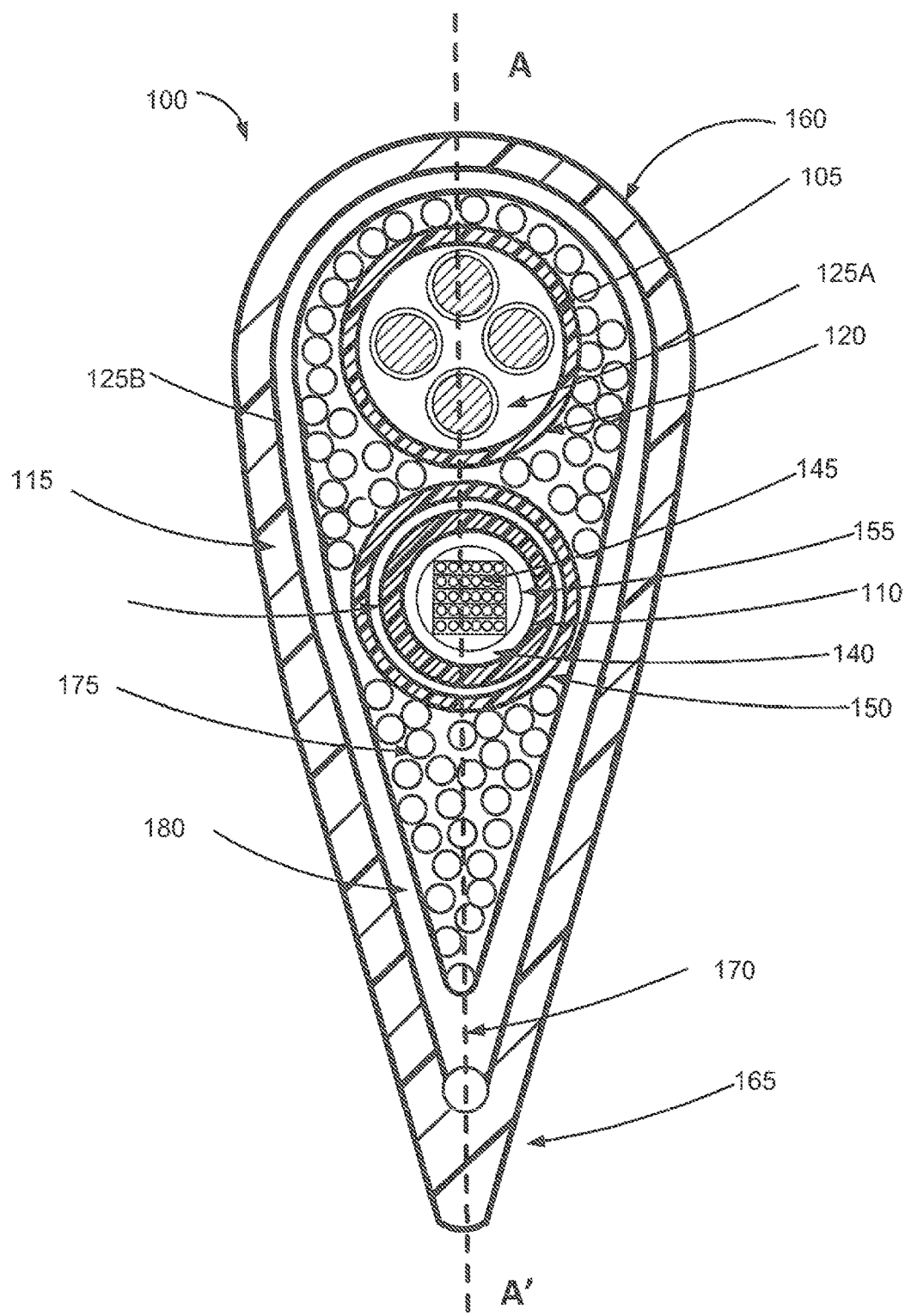
FIGS. 1 and 2 depict cross-sectional views of example cables having airfoil shapes that may be utilized as suitable tethers for drones and/or other devices, according to illustrative embodiments of the disclosure.

FIG. 1 depicts a cross-section view of an example hybrid cable 100 that may be utilized as a tether in conjunction with aerial devices, according to an illustrative embodiment of the disclosure. The cable 100 is illustrated as a hybrid or composite cable that includes a combination of metallic conductors and optical fibers; however, cables having a similar airfoil shaped jacket may include a wide variety of different transmission media and/or combinations of transmission media, including but not limited to, power conductors, twisted pair conductors, optical fibers, coaxial cables, etc. As illustrated in FIG. 1, the cable 100 may be a hybrid cable including one or more conductor components 105 and one or more optical fiber components 110. An outer jacket 115 may enclose the conductor component(s) 105, the optical fiber components 110, and/or other internal components of the cable 100. According to an aspect of the disclosure, the jacket 115 may be formed with a cross-sectional shape, such as an airfoil shape, that permits the cable 100 to orient itself towards the wind during operation. Each of these components, as well as additional components that may optionally be incorporated into the cable 100, is described in greater detail below.

Figure 2:
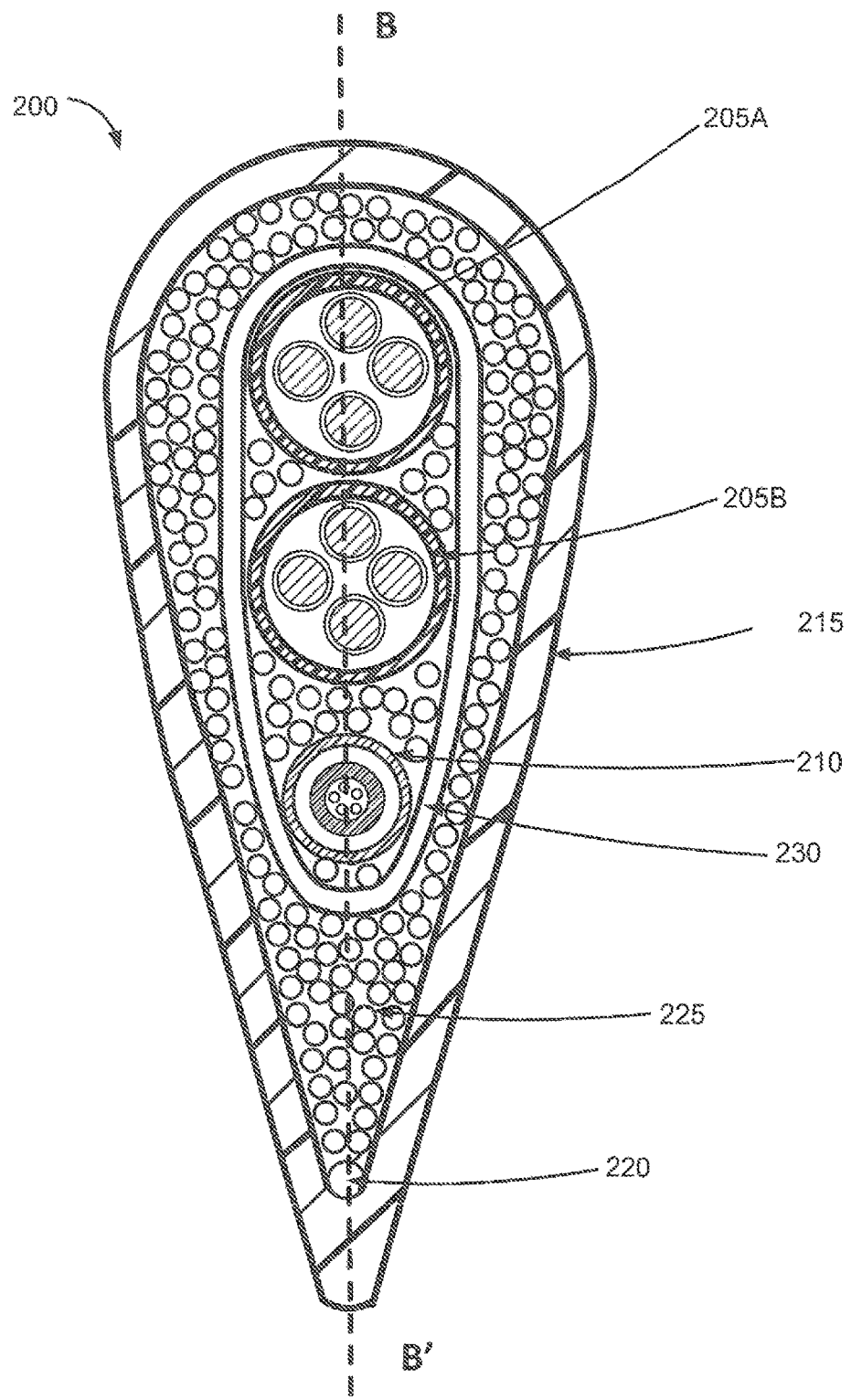

As desired, any number of suitable conductors may be incorporated into the cable 100. The one or more conductors may be configured to deliver a suitable power signal to an aerial device and/or systems or devices positioned on the aerial device (e.g., transmission equipment, antennas, etc.). In certain embodiments, the one or more conductors (or a subset or conductors) may be configured to transmit or carry telecommunications or data signals to an aerial device, such as one or more control signals. Indeed, a wide variety of suitable signals may be transmitted via the conductor(s) incorporated into the cable 100. As shown in FIG. 1, one or more conductors may be incorporated into one or more conductor components 105. In other embodiments, one or more conductors may be loosely positioned within the jacket 115 and/or incorporated into other components (e.g., a sheathed subcomponent that includes both conductors and other transmission media, etc.). Yet other embodiments may include a combination of conductor components, loosely positioned conductors, and/or conductors incorporated into other components. Further, although FIG. 1 illustrates a single conductor component 105, any suitable number of conductor components may be utilized as desired in various embodiments. For example, FIG. 2 illustrates an example cable 200 that includes two conductor components. Indeed, conductors may be incorporated into a wide variety of different components and/or combinations of components as desired in various embodiments.

Each conductor component 105 may include any suitable number of conductors housed within a suitable sheath or wrap, such as a conductor component jacket 120. In certain embodiments, the conductor component 105 may include a plurality of twisted pairs 125A, 125B of individually insulated conductors. Other types of conductors (e.g., parallel conductors, individual untwisted conductors, etc.) suitable for transmitting power may be utilized in other embodiments. In certain embodiments, use of twisted pairs 125A, 125B and/or other relatively small gauge conductors may provide the cable 100 with enhanced flexibility and/or lower weight relative to cables that include larger power conductors. Any number of twisted pairs 125A, 125B (or other conductors) may be incorporated into a conductor component 105 as desired in various embodiments, such as the illustrated two twisted pairs 125A, 125B. Each twisted pair (referred to generally as twisted pair 125) may include two electrical conductors, each covered with respective insulation. The electrical conductors of a twisted pair 125 (or other conductors incorporated into the cable 100) may be formed from any suitable electrically conductive material, such as copper, aluminum, silver, annealed copper, gold, a conductive alloy, etc. Additionally, the electrical conductors may have any suitable diameter, gauge, and/or other dimensions. Further, each conductor may be formed as either a solid conductor or as a conductor that includes a plurality of conductive strands that are twisted together. A stranded conductor formed from a plurality of strands may exhibit enhanced flexibility relative to a solid conductor.

In certain embodiments, electrical conductors, such as the conductor of one or more twisted pairs 125, may be sized in order to transmit a desired power signal. For example, the electrical conductors may be formed with a suitable diameter or cross-sectional area that facilitates transmission of a desired root mean square ("RMS") power signal (e.g., a 300 V RMS signal, etc.). Each of the conductors may be formed with any suitable diameter. In certain embodiments, the electrical conductors of certain twisted pairs may be approximately 22 AWG conductors. Other conductor sizes and/or gauges may be utilized as desired, such as conductors that are approximately 12, 14, 16, 18, 20, 22, or 24 AWG, or conductors having sizes included in a range between any two of the above values (e.g., conductors between approximately 12 and approximately 24 AWG), or conductors having sizes included in a range bounded on either a minimum or maximum end by one of the above values.

The conductor insulation may include any suitable dielectric materials and/or combination of materials. Examples of suitable dielectric materials include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins, a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. Additionally, in certain embodiments, the insulation of each conductor utilized in a conductor component 105 or the cable 100 may be formed from similar materials. In other embodiments, at least two of the conductors may utilize different insulation materials. As desired in certain embodiments, insulation may additionally include a wide variety of other materials (e.g., filler materials, materials compounded or mixed with a base insulation material, etc.), such as smoke suppressant materials, flame retardant materials, etc.

In various embodiments, conductor insulation may be formed from one or multiple layers of insulation material. A layer of insulation may be formed as solid insulation, unfoamed insulation, foamed insulation, or other suitable insulation. As desired, a combination of different types of insulation may be utilized. For example, a foamed insulation layer may be covered with a solid foam skin layer. Additionally, the insulation may be formed with any suitable thickness, inner diameter, outer diameter, and/or other dimensions. In the event that one or more twisted pairs are utilized, such as twisted pairs 125A, 125B, each of the twisted pairs may be formed with any suitable twist lay. In certain embodiments, the twisted pairs 125A, 125B may be formed with similar or approximately equal twist lays. In other embodiments, various twisted pairs may be formed with different twist lays. A wide variety of suitable combinations of twist lays may be utilized as desired in various embodiments. Additionally, in certain embodiments, the plurality of twisted pairs 125A, 125B included in a conductor component 105 may be twisted together with any suitable overall or bunch lay. In other embodiments, the plurality of twisted pairs 125A, 125B may be loosely positioned within the conductor component 105 without being twisted together.

In certain embodiments, the conductor component 105 may additionally include a sheath or wrap that is formed around the plurality of twisted pairs 125A, 125B and/or other conductors. In certain embodiments, the sheath may be formed as a conductor component jacket 120. For example, an extruded jacket may be formed around the twisted pairs 125A, 125B. In other embodiments, one or more binder threads may be helically wrapped around the twisted pairs 125A, 125B. In other embodiments, one or more tapes or other wraps (e.g., single layer wraps, multi-layer wraps, etc.) may be curled, helically wrapped, or otherwise formed around the twisted pairs 125A, 125B. For example, a tape or other wrap may be longitudinally curled around the twisted pairs 125A, 125B by positioning the tape adjacent to the twisted pairs 125A, 125B and curling one or both longitudinally extending widthwise edges around the twisted pairs 125A, 125B. As desired, the tape or wrap may be bonded, adhered, ultrasonic welded, or otherwise affixed to itself (e.g., affixed with mechanical fasteners, etc.) after it is wrapped or curled around the twisted pairs 125A, 125B. The outer sheath may assist in maintaining the positions of the twisted pairs 125A, 125B and/or holding or bundling the twisted pairs 125A, 125B together.

Although a wide variety of suitable outer sheaths may be utilized as desired in a conductor component 105, FIG. 1 illustrates the use of a conductor component jacket 120. In certain embodiments, a conductor component 105 that includes a jacket 120 may be characterized as a subcable or sheathed component within the cable 100. The conductor component jacket 120 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. In certain embodiments, the conductor component jacket 120 may be formed from and/or may include ultraviolet light ("UV") resistant materials. As desired, the conductor component jacket 120 may also include a wide variety of other suitable additives. The conductor component jacket 120 may also include a single layer or, alternatively, multiple layers of material (i.e., multiple layers of the same material, multiple layers of different materials, etc.).

The conductor component jacket 120 may be formed with a wide variety of suitable dimensions, as desired in various embodiments, such as any suitable cross-sectional shape (e.g., an approximately circular cross-sectional shape, an elliptical or oval cross-sectional shape, etc.), any suitable inner diameter, any suitable outer diameter, any suitable wall thickness, etc. In certain embodiments, the conductor component jacket 120 may be sized to house the internal components of the conductor component 105, such as the twisted pairs 125A, 125B.

A wide variety of other components may be situated within a conductor component as desired in various embodiments. Other potential components include, hut are not limited to, other transmission media (e.g., optical fibers, etc.), various separators or dividers (e.g., separators positioned between transmission media, etc.), spacers (e.g., spacers that result in the conductor component 105 having a desired overall shape, etc.), one or more ripcords, one or more strength members (e.g., strength yarns, etc.), an armor layer, one or more water blocking components (e.g., a water blocking tape or wrap, water swellable fibers, etc.), and/or one or more shielding layers (e.g. a metallic foil shield, a braided shield, a shield that includes discontinuous patching or electrically conductive or other shielding material, etc.). Indeed, a wide variety of different conductor component constructions may be utilized in accordance with various embodiments of the disclosure. A few example components that may optionally be incorporated into a conductor component 105, such as strength members, water blocking materials, and ripcords are discussed in greater detail below with general reference to the cable 100. It will be appreciated that similar components may be incorporated into a conductor component 105.

In certain embodiments, a conductor component 105 may be formed as a "dry" component. Indeed, a "dry" component may typically have a lower weight than a filled component. In other embodiments, one or more suitable filler materials may be incorporated into a conductor component 105. For example, a low density filling component (e.g., a filling compound that includes a plurality of microspheres suspended in a base solution, etc.) or other suitable filling compound may be positioned within the conductor component jacket 120 and/or in the interstices between the twisted pairs 125A, 125B and/or other internal components of the conductor component 105. The filling compound may assist in water blocking and/or may provide mechanical support or protection for the twisted pairs 125A, 125B and/or other conductors incorporated into a conductor component 105.

With continued reference to FIG. 1, the cable 100 may include one or more optical fiber components 110. Any suitable number of optical fiber components 110 may be incorporated into the cable 100 as desired. Each optical fiber component 110 may include any suitable number of optical fiber structures housed within a suitable sheath or wrap, such as an optical fiber component jacket 135. A wide variety of different types of optical fiber structures may be utilized as desired in various embodiments. For example, in certain embodiments, optical fibers may be housed in one or more buffer tubes. In other embodiments, optical fibers may be housed in one or more microtubes having an inner diameter that is sized to allow housed optical fibers to move relative to one another while preventing the optical fibers from crossing over or overlapping one another. In other words, a microtube may permit the optical fibers to flex or move as the cable 100 is flexed or bent while simultaneously maintaining the position of each optical fiber relative to the other optical fibers. In yet other embodiments, one or more tight buffered optical fibers may be incorporated into an optical fiber component 110. A tight buffer may be formed from any suitable material and/or combinations of materials and/or with any suitable thickness. In yet other embodiments, one or more optical fiber components 100 may include a combination of different types of fiber structures.

As shown in FIG. 1, an optical fiber component 110 may include one or more buffer tubes 140. Each buffer tube 140 may be a suitable sheath configured to house one or more optical fibers 145. In certain embodiments, a buffer tube 140 may be formed as a loose tube. In other words, the optical fibers 145 may be loosely positioned within the buffer tube 140. As desired, a plurality of optical fibers 145 may be arranged into one or more suitable bundles or groupings. In other embodiments, a plurality of optical fibers may be incorporated into one or more ribbons and/or a ribbon stack.

A buffer tube 140 may be formed from any suitable materials or combinations of materials. Examples of suitable materials include, but are not limited to, various polymers or polymeric materials, acrylate or acrylics (e.g., acrylic elastomers, etc.), polyvinyl chloride ("PVC"), polyurethane, a fluoropolymer, polyethylene, neoprene, polyvinylidene fluoride ("PVDF"), polybutylene terephthalate ("PBT"), ethylene, plastic, or other appropriate materials or combinations of suitable materials. Additionally, the buffer tube 140 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins. Further, the buffer tube 140 may have any suitable inner diameter, outer diameter, and/or thickness as desired in various applications. For example, the buffer tube 140 may be appropriately sized to house a desired number of optical fibers 145 and/or any other components incorporated into the buffer tube 140.

Although a single buffer tube 140 is illustrated in FIG. 1, any suitable number of buffer tubes may be incorporated into an optical fiber component 110 and/or cable 100 as desired in various embodiments. For example, a plurality of buffer tubes 140 may be loosely positioned within an optical fiber component 110, helically twisted together or S-Z stranded together within an optical fiber component 110, or helically twisted together or S-Z stranded around another component (e.g., a central strength member, a conductor, a conductor component, etc.) within the cable 100. As desired in embodiments that utilize a plurality of buffer tubes, one or more spacers, fillers, or other components may be utilized in place of one or more of the buffer tubes. Alternatively, one or more empty buffer tubes may be utilized. Spacers, fillers, and/or empty buffer tubes may be utilized to provide an optical fiber component 110 and/or the cable 100 with a desired overall cross-sectional shape (e.g., a round shape, etc.).

Any suitable number of optical fibers 135 may be housed within a buffer tube 140 or other fiber structure (e.g., a microtube, etc.). For example, a buffer tube 140 may be configured to house one, two, four, six, eight, twelve, twenty-four, or any other suitable number of optical fibers. Further, in certain embodiments having a plurality of buffer tubes, each of the plurality of buffer tubes may house the same number of optical fibers. In other embodiments, at least two of a plurality of buffer tubes may house a different number of optical fibers. Each optical fiber may be a single mode fiber, multi-mode fiber, pure-mode fiber, polarization-maintaining fiber, multi-core fiber, or some other optical waveguide that carries data optically. Additionally, each optical fiber may be configured to carry data at any desired wavelength (e.g., 1310 nm, 1550 nm, etc.) and/or at any desired transmission rate or data rate. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness. In certain embodiments, an optical fiber may include a core that is surrounded by a cladding. Additionally, one or more suitable coatings may surround the cladding. The optical fibers 145 may facilitate the transmission of communications and/or data signals to a drone or other device via the cable 100.

In certain embodiments, the optical fiber component 110 may additionally include a sheath or wrap that is formed around the internal components of the of the optical fiber component 110. In certain embodiments, the sheath may be formed as an optical fiber component jacket 150. For example, an extruded jacket may be formed around the buffer tube 140 and/or other internal components. In other embodiments, one or more binder threads, tapes, and/or other wraps may be formed around the other components of the optical fiber component 110 in a similar manner as that described above for the conductor component 105.

Although a wide variety of suitable outer sheaths may be utilized as desired in an optical fiber component 110, FIG. 1 illustrates the use of an optical fiber component jacket 150. In certain embodiments, an optical fiber component 110 that includes a jacket 150 may be characterized as a subcable or sheathed component within the cable 100. The optical fiber component jacket 150 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. In certain embodiments, the optical fiber component jacket 150 may be formed from and/or may include ultraviolet light ("UV") resistant materials. As desired, the optical fiber component jacket 150 may also include a wide variety of other suitable additives. The optical fiber component jacket 150 may also include a single layer or, alternatively, multiple layers of material (i.e., multiple layers of the same material, multiple layers of different materials, etc.).

The optical fiber component jacket 150 may be formed with a wide variety of suitable dimensions as desired in various embodiments, such as any suitable cross-sectional shape (e.g., an approximately circular cross-sectional shape, an elliptical or oval cross-sectional shape, etc.), any suitable inner diameter, any suitable outer diameter, any suitable wall thickness, etc. In certain embodiments, the optical fiber component jacket 120 may be sized to house the internal components of the optical fiber component 110.

A wide variety of other components may be situated within an optical fiber component 110 as desired in various embodiments. For example, one or more inserts 155, such as a water blocking insert, a cushioning insert, a dry insert, etc., may be wrapped around the optical fibers 145 within a buffer tube 140. Other potential components include, but are not limited to, other transmission media, spacers, one or more ripcords, one or more strength members (e.g., strength yarns, etc.), an armor layer, one or more water blocking components (e.g., a water blocking tape or wrap, water swellable fibers, etc.), etc. Indeed, a wide variety of different optical fiber component constructions may be utilized in accordance with various embodiments of the disclosure. A few example components that may optionally be incorporated into an optical fiber component 110, such as strength members, water blocking materials, and ripcords are discussed in greater detail below with general reference to the cable 100. It will be appreciated that similar components may be incorporated into an optical fiber component 110.

In certain embodiments, an optical fiber component 110 may be formed as a "dry" component. In other embodiments, one or more suitable filler materials may be incorporated into an optical fiber component 110. For example, a low density filling component (e.g., a filling compound that includes a plurality of microspheres suspended in a base solution, etc.) or other suitable filling compound may be positioned within the optical fiber component jacket 110 and/or within a buffer tube 140. The filling compound may assist in water blocking and/or may provide mechanical support or protection for the optical fibers 145 and/or other conductors incorporated into an optical fiber component 110.

As shown in FIG. 1, separate conductor components and optical fiber components may be incorporated into a cable 100 in certain embodiments. For example, conductor components and optical fiber components may be formed as separate subcables within the overall cable. In other embodiments, both conductors and optical fibers may be incorporated into a subcable or other internal component of the cable 100. Indeed, a wide variety of suitable components and/or combinations of components may be incorporated into a hybrid cable 100 as desired in various embodiments. The constructions illustrated herein are provided by way of non-limiting example only.

With continued reference to FIG. 1, an outer or overall jacket 115 may be formed around the conductor component 105, optical fiber component 110, and any other internal components of the cable 100. In other words, the outer jacket 115 may define an outer periphery of the cable 100. The jacket 115 may enclose the internal components of the cable 100, seal the cable 100 from the environment, and provide strength and structural support. At least one opening enclosed by the jacket 115 may be referred to as a cable core, and any number of other cable components may be disposed in a cable core.

According to an aspect of the disclosure, the outer jacket 115 may have a cross-sectional shape that permits the cable 100 to orient itself towards the wind and/or other environmental forces when it is used in conjunction with an aerial device (e.g., a drone, etc.). For example, the jacket 115 may have a cross-sectional shape that is similar to an airfoil or aerofoil. The cross-sectional shape may include a first edge 160 that is formed as a rounded edge or that has a rounded profile. Additionally, the cross-sectional shape may include a second edge 165 that is formed as a tailing edge, such as a relatively sharp, narrowing, or approximately pointed tailing edge.

In certain embodiments, the cross-sectional shape of the jacket 115 may narrow or taper between the first edge 160 and the second edge 165. Any degree of taper or narrowing may be utilized as desired in various embodiments. In other embodiments, the cross-sectional shape of the jacket 115 may widen along respective first portions of opposite lateral sides of the jacket 115 from the rounded edge 160. The cross-sectional shape of the jacket 115 may then taper or narrow along respective second portions of the opposite lateral sides of the jacket 115 from the ends of the first portions to the second or tailing edge 165. Alternatively, portions of the cross-sectional shape that widen from the first rounded edge 160 may be considered as part of the first edge 160. In certain embodiments, the cross-sectional shape of the jacket 115 may also include parallel portions positioned between the first edge 160 and the second edge 165 along opposite lateral sides. For example, parallel portions may be positioned between sections of the jacket 115 in which the cross-sectional shape is widened and sections of the jacket 115 in which the cross-sectional shape is narrowed. As another example, parallel or approximately parallel portions may be positioned between two sections in which the cross-sectional shape widens and/or between two sections in which the cross-sectional shape narrows. Indeed, the jacket 115 may be formed with a wide variety of suitable cross-sectional shapes extending between a first rounded edge 160 and a second tailing edge 165.

In certain embodiments, the outer jacket 115 may also have a symmetrical cross-sectional shape. For example, the cross-sectional shape of the jacket 115 may be symmetrical on opposite sides of a line A-A' that bisects the cable 100 through the first edge 160 and the second or tailing edge 165. The line A-A' may be a cross-sectional line that is perpendicular to the longitudinal length of the cable 100. Additionally, in certain embodiments, the cross-sectional shape of the outer jacket 115 may be characterized as a symmetrical airfoil shape. When the cable 100 is utilized as a tether for an aerial device (e.g., a drone), the cable 100 may be swivel or gimbal connected to the aerial device and/or to a base, thereby allowing the cable 100 to pivot or rotate. Further, when wind or another force is exerted onto the cable 100, the wind may contact the outer jacket 115 and result in a lifting force that causes the cable 100 to orient itself with the first or rounded edge 160 of the jacket 115 facing the wind. The symmetrical cross-sectional shape may also result in approximately equal lift forces along opposite lateral directions or sides of the jacket 115 when the first edge 160 faces the wind. As a result, the cable 100 may align in a relatively wind-resistant configuration, thereby reducing the effects of wind forces and/or Aeolian vibration.

The outer jacket 115 may be formed with a wide variety of suitable dimensions as desired in various embodiments. For example, the jacket 115 may include a first or rounded edge 160 that is formed with any suitable degree of curvature. The jacket 115 may also include any suitable cross-sectional length along the line A-A'. The jacket 115 may also have any suitable cross-sectional width perpendicular to both the line A-A' and the longitudinal length of the cable 100. Further the jacket 115 may have any suitable degree of narrowing or tapering along its opposing lateral sides leading to the second edge 165.

In certain embodiments, one or more dimensions of the jacket 115 may be selected based at least in part on the dimensions of internal components of the cable 100. For example, the outer jacket 115 may be sized to house any number of desired conductors, conductor components 105, optical fiber components 110, strength members, and/or other components of the cable 100. In certain embodiments, as power and/or communications requirements of an aerial device increase, the size of the outer jacket 115 may be scaled up in order to accommodate a greater number and/or larger internal components.

The outer jacket 115 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. In certain embodiments, the outer jacket 115 may be formed from and/or may include ultraviolet light ("UV") resistant materials, such as UV resistant polymeric materials. As desired, the outer jacket 115 may also include a wide variety of other suitable additives. The outer jacket 115 may also include a single layer or, alternatively, multiple layers of material (i.e., multiple layers of the same material, multiple layers of different materials, etc.).

A wide variety of other components may be situated within a cable core (e.g., within the outer jacket 115) as desired in various embodiments of the disclosure. In certain embodiments, at least one "ripcord" 170 may be incorporated into the cable 100, for example, within a cable core. The cable 100 of FIG. 1 is illustrated as having one ripcord 170 positioned near the second edge 165 of the outer jacket 115. In certain embodiments, the ripcord 170 may be positioned between the jacket 115 and another layer, such as a water blocking tape layer. Any other suitable number of ripcords may be utilized as desired. A ripcord 170 may facilitate separating the jacket 115 from other components of the cable 100. In other words, the ripcord 115 may help open the cable 100 for installation or field service. A technician may pull the ripcord 115 during installation in order to access internal components of the cable 100. A ripcord may be formed from a wide variety of suitable materials and/or with a wide variety of suitable dimensions.

In certain embodiments, one or more strength members may also be incorporated into a cable core. For example, a plurality of strength yarns 175 may be positioned within the cable core. In certain embodiments, a plurality of strength yarns 175 may be used to fill the cable core. Strength yarns may be relatively flexible and/or relatively light weight strength members. A wide variety of suitable strength yarns may be utilized as desired including, but not limited to, aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, etc. In certain embodiments, relatively high strength aramid fibers, such as Kevlar® fibers or para-aramid synthetic fibers may be utilized as strength members. Additionally, in certain embodiments, dielectric strength yarns or fibers may be utilized.

The strength yarns 175 may be positioned in a wide variety of locations within the cable core. For example, the strength yarns 175 may be positioned in the interstices between the conductor component 105, the optical fiber component 110, and/or other internal components. The strength yarns 175 may also be positioned between internal components and an inner surface of the outer jacket 115 or any other suitable wraps or sheaths formed around the internal components of the cable 100. In certain embodiments, the strength yarns 175 may extend in a longitudinal direction parallel to other internal components of the cable 100, such as the conductor component 105 and the optical fiber component 110. In other words, the strength yarns 175 may extend approximately parallel to a longitudinal length of the cable 100. In other embodiments, the strength yarns 175 or subsets of the strength yarns may be helically twisted together and/or wrapped around one or more components of the cable 100, such as the conductor component 105 and/or the optical fiber component 110.

In certain embodiments, one or more strength members other than strength yarns may be incorporated into the cable 100. For example, one or more relatively rigid strength members (e.g., strength rods, etc.) may be incorporated into the cable 100. In certain embodiments, one or more strength rods may be embedded in the jacket 115. In other embodiments, one or more strength rods may be situated within a cable core. Indeed, a wide variety of strength member configurations may be utilized. Regardless of the type(s) of strength yarns and/or other strength members utilized, the strength members may provide structural support for the cable 100. For example, the strength members may provide structural support for forces exhibited on the cable 100, such as forces exhibited by the weight of the cable 100, forces exerted by movements of an aerial device, wind forces, and/or other environmental forces. In certain embodiments, the strength members may assist the cable 100 in maintaining a suitable tether with an aerial device in the presence of anticipated forces exhibited on the cable 100.

With continued reference to FIG. 1, one or more water blocking components may optionally be incorporated into the cable 100. For example, a water blocking tape 180 may optionally be wrapped or positioned around the strength yarns 175 and/or other internal components of the cable 100. In certain embodiments, a water blocking tape 180 may be positioned adjacent to an internal surface of the outer jacket 115 and/or another wrap formed around the internal components of the cable 100. In other embodiments, a water blocking tape 180 may be wrapped or positioned around a portion of the internal components of the cable 100. For example, as shown in FIG. 2, a water blocking tape 180 may be wrapped around the conductor component(s) and the optical fiber component(s) of a cable. As desired, strength members may be positioned within the area enclosed by the water blocking tape and/or outside the water blocking tape.

The water blocking tape 180 may be formed from a wide variety of suitable materials and/or combinations of materials. For example, the water blocking tape 180 may be formed as a polymer tape that includes superabsorbent powder ("SAP") or other suitable water absorbing and/or water blocking materials formed thereon or positioned between two polymeric layers. A water blocking tape 180 may also have a wide variety of suitable dimensions, such as any suitable thickness. In other embodiments, one or more water swellable yarns may be positioned within the cable core. For example, one or more water swellable yarns may be mixed in with the strength yarns 175 or utilized in place of the strength yarns. In yet other embodiments, at least a portion of the strength yarns 175 may include water swellable material (e.g., SAP adhered to the surface of strength yarns 175 and/or embedded into strength yarns 175, etc.). In other words, at least a portion of the strength yarns may be formed as water swellable strength yarns. As desired, water swellable yarns may extend approximately parallel to the longitudinal direction of the cable 100. Alternatively, at least a portion of the water swellable yarns may be twisted together or wrapped around other internal components of the cable 100.

In certain embodiments, the cable 100 may be formed as a "dry" cable. In other words, substantially no filling compounds, oils, or greases may be positioned within the cable core. A dry cable may be relatively lighter than a filled cable. In certain embodiments, the relatively lighter weight may facilitate easier deployment with an aerial device. In other embodiments, one or more suitable filler materials may be incorporated into a cable core. For example, a low density filling component (e.g., a filling compound that includes a plurality of microspheres suspended in a base solution, etc.) or other suitable filling compound may be positioned within the cable core. The filling compound may assist in water blocking and/or may provide mechanical support or protection for the optical fibers 145 and/or other conductors incorporated into an optical fiber component 110.

FIG. 2 depicts a cross-sectional view of another example hybrid cable 200 having an airfoil shape that may be utilized as a suitable tether for drones and/or other aerial devices, according to an illustrative embodiment of the disclosure. The cable 200 of FIG. 2 may include components that are similar to those described above with reference to the cable 100 of FIG. 1. For example, the cable 200 may include one or more conductor components 205A, 205B and one or more optical fiber components 210. An outer jacket 215 may enclose the conductor component(s) 205, the optical fiber components 210, and/or other internal components of the cable 200, such as a ripcord 220, strength yarns 225, and/or a water blocking tape or wrap 230.

According to an aspect of the disclosure, the jacket 215 may be formed with a cross-sectional shape, such as an airfoil shape, that permits the cable 200 to orient itself towards the wind during operation. The jacket 215 may have a similar cross-sectional shape as the jacket 115 illustrated in FIG. 1. For example, the jacket 215 may have a cross-sectional shape that includes a first rounded edge and a second tailing edge. As desired, the cross-sectional shape may taper or narrow between the rounded edge and the tailing edge. Further, in certain embodiments, the jacket 215 may have a cross-sectional shape that is symmetrical on opposites sides of a line B-B' that bisects the jacket's cross-section through the rounded edge and the tailing edge.

In contrast to the cable 100 of FIG. 1, the cable 200 of FIG. 2 includes a plurality of conductor components 205A, 205B rather than a single conductor component. It will be appreciated that any number of suitable conductor components and/or optical fiber components may be incorporated into a cable as desired in various embodiments. Additionally, FIG. 2 illustrates an optical fiber component 210 that has a smaller diameter than the conductor components 205A, 205B. Indeed, as desired in various embodiments, internal components of a cable may be formed with a wide variety of suitable dimensions.

Further, the cable 200 of FIG. 2 includes a water blocking tape 230 that is formed around and in contact with the conductor components 205A, 205B and the optical fiber component 210. As a result, a first portion of the strength yarns 225 may be positioned inside the tape 230 while a second portion of the strength yarns 225 may be positioned between the tape 230 and the jacket 215. By contrast, the water blocking tape 180 of FIG. 1 is adjacent to an internal surface of the outer jacket 115. As desired, water blocking tapes, other wraps, strength members, and/or other internal components of a cable may be positioned in a wide variety of suitable arrangements. Those illustrated in FIGS. 1 and 2 are provided by way of non-limiting example only.

The cables 100, 200 illustrated in FIGS. 1 and 2 are provided by way of example only. Embodiments of the disclosure contemplate a wide variety of other cables and cable constructions. These other cables may include more or less components than the cables 100, 200 illustrated in FIGS. 1 and 2. Additionally, certain components may have different dimensions and/or materials than the components illustrated in FIGS. 1 and 2.

Cables made in accordance with embodiments of this disclosure, such as the example cables 100, 200 illustrated in FIGS. 1 and 2, may be utilized in conjunction with a wide variety of suitable aerial devices and/or in a wide variety of suitable applications. For example, the cables 100, 200 may be utilized as tether cables for a wide variety of aerial devices, such as drones, balloons, and/or other aerial devices. These aerial devices may be utilized for a wide variety of suitable applications, such as delivery of telecommunications services, surveillance, etc. For example, a drone or other aerial device may include one or more antennas or other components that provide cellular, mobile, or other telecommunications services.

In certain embodiments, a cable 100, 200 may extend vertically or approximately vertically between a suitable base station, such as a vehicle, building, or other base station to an aerial device. In certain applications, regulations may limit a maximum allowable altitude for an unmanned aerial device. For example Federal Aviation Administration regulations limit unmanned aerial device altitude to 400 feet. As a result, a cable 100, 200 may have a length corresponding to a maximum allowable altitude. For example, a cable 100, 200 may have a length of approximately 400 feet or less. Additionally, the cable 100, 200 may provide power and/or communication signals to the aerial device and/or equipment positioned on the aerial device (e.g., transmission equipment, antennas, etc.).

Figure 3:
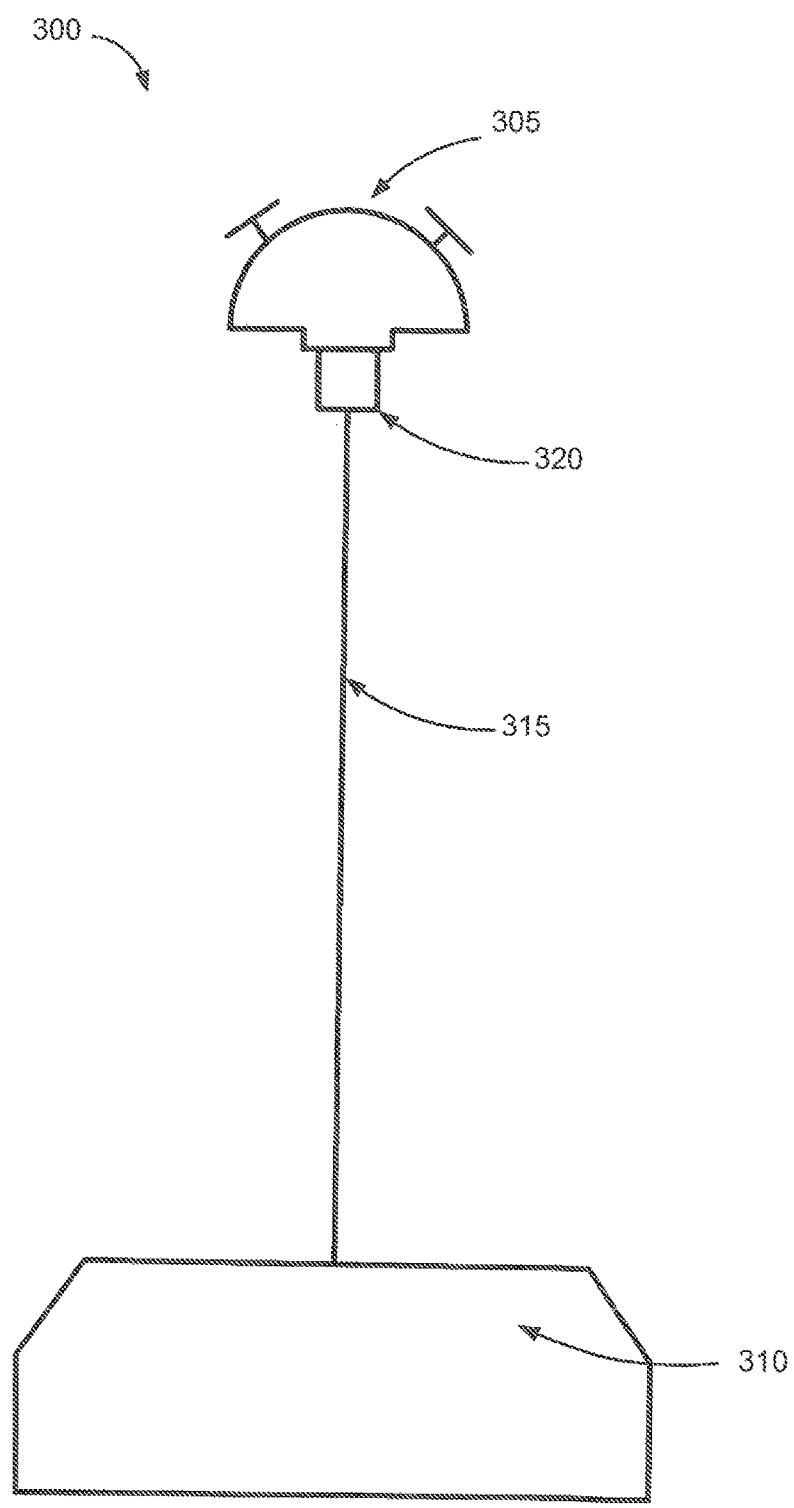
FIG. 3 depicts a schematic view of an example tethered drone system that may utilize an airfoil cable, according to an illustrative embodiment of the disclosure.

FIG. 3 depicts a schematic view of an example tethered drone system 300 that may utilize an airfoil cable, according to an illustrative embodiment of the disclosure. A relatively stationary drone 305 or other aerial device may be tethered to a base station 310, such as a stationary base station or a vehicle, by a cable 315 formed in accordance with embodiments of the disclosure. According to an aspect of the disclosure, the cable 315 may have a cross-sectional shape that permits the cable 315 to orient itself towards the wind during operation. For example, the cable 315 may have an airfoil design that is similar to those discussed above with reference to the cables 100, 200 of FIGS. 1 and 2. As desired, the cable 315 may supply power and/or communications signals to the drone 305 and/or equipment positioned on the drone. As a result, the drone 305 may remain in aerial operation for an extended period of time. Additionally, communications transmitters and/or other equipment may be powered.

Additionally, the cable 315 may be swivel, gimbal, or pivot mounted to the drone 305 and/or the base station 310. For example, a suitable gimbal 320 or other swivel mount may be utilized to form a connection between the cable 315 and the drone 305. A similar connection may be utilized as desired between the cable 315 and the base station 310. As a result, the cable 315 may be free to turn or pivot as wind and other environment forces impact the cable 315. Further, the cross-sectional airfoil design of the cable 315 may facilitate the cable orienting itself such that a first or rounded edge of the cable 315 faces the wind or other environmental forces. The cable 315 may align itself in a relatively wind-resistant configuration, thereby reducing the effects of wind forces and/or Aeolian vibration. When oriented towards the wind (i.e., a first rounded edge facing the wind, etc.), the lift forces exerted on the cable may be approximately equal in opposite lateral directions along an outer periphery of the cable 315.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable, comprising:
   at least one conductor configured to carry a power signal;
   at least one optical fiber component, each optical fiber component comprising at least one optical fiber;
   a plurality of aramid strength members surrounding the at least one conductor and the at least one optical fiber component; and
   a jacket formed around the at least one conductor, the at least one optical fiber component, and the plurality of aramid strength members, the jacket having a cross-sectional shape that is symmetrical about a center line extending from a first edge to a second edge, the first edge comprising a rounded profile, and the cross-sectional shape having a tapered profile between the first edge and the second edge.

2. The cable of claim 1, wherein a lift force exerted on the cable is approximately equal in opposite lateral directions along an outer periphery of the cable when the cable extends in a vertical direction and the first edge faces the wind.

3. The cable of claim 1, wherein the second edge comprises a sharp tailing edge opposite the first edge.

4. The cable of claim 1, wherein the cross-sectional shape comprises an airfoil shape.

5. The cable of claim 1, wherein the at least one conductor comprises a plurality of twisted pairs of individually insulated conductors.

6. The cable of claim 1, wherein the at least one optical fiber component comprises a buffer tube and the at least one optical fiber comprises a plurality of optical fibers positioned within the buffer tube.

7. The cable of claim 1, wherein the plurality of aramid strength members comprises a plurality of aramid yarns or aramid fibers.

8. The cable of claim 1, further comprising water-blocking material positioned within the jacket.

9. A cable, comprising:
at least one conductor;
at least one optical fiber; and
a jacket formed around the at least one conductor and the at least one optical fiber, the jacket having a cross-sectional airfoil shape that is symmetrical about a center line extending from a rounded edge to a sharp tailing edge,
a plurality of aramid strength members positioned within the jacket between the at least one conductor and the at least one optical fiber and surrounding the at least one conductor and the at least one optical fiber.

10. The cable of claim 9, wherein a lift force exerted on the cable is approximately equal in opposite lateral directions along an outer periphery of the cable when the cable extends in a vertical direction and the rounded edge faces the wind.

11. The cable of claim 9, wherein the cross-sectional shape is tapered between the rounded edge and the sharp tailing edge.

12. The cable of claim 9, wherein the at least one conductor comprises at least one twisted pair of individually insulated conductors.

13. The cable of claim 9, further comprising a buffer tube formed around the at least one optical fiber, the buffer tube positioned within the jacket.

14. The cable of claim 9, wherein the plurality of aramid strength members comprises a plurality of aramid yarns or aramid fibers.

15. The cable of claim 9, further comprising water-blocking material positioned within the jacket.

16. A cable, comprising:
at least one conductor;
at least one optical fiber;
a plurality of aramid strength members surrounding the at least one conductor and the at least one optical fiber; and
a jacket formed around the at least one conductor, the at least one optical fiber, and the plurality of aramid strength members, the jacket comprising a cross-sectional airfoil shape that is symmetrical about a center line.

17. The cable of claim 16, wherein the cross-sectional shape airfoil shape comprises a first rounded edge and a sharp tailing edge.

18. The cable of claim 16, wherein the at least one conductor comprises at least one of twisted pair of individually insulated conductors.

19. The cable of claim 16, further comprising a buffer tube formed around the at least one optical fiber, the buffer tube positioned within the jacket.

20. The cable of claim 16, wherein the a plurality of aramid strength members comprises a plurality of aramid yarns or aramid fibers.

* * * * *